(12) United States Patent
Ciubotariu et al.

(10) Patent No.: US 10,338,943 B1
(45) Date of Patent: Jul. 2, 2019

(54) TECHNIQUES FOR EMULATING MICROPROCESSOR INSTRUCTIONS

(71) Applicant: Symantec Corporation, Mountain View, CA (US)

(72) Inventors: Mircea Ciubotariu, Culver City, CA (US); Costin Ionescu, Marina Del Rey, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 783 days.

(21) Appl. No.: 14/857,537

(22) Filed: Sep. 17, 2015

(51) Int. Cl.
*G06F 9/455* (2018.01)

(52) U.S. Cl.
CPC .............................. *G06F 9/45508* (2013.01)

(58) Field of Classification Search
USPC .......... 703/2, 23, 26; 711/205; 712/203, 209
See application file for complete search history.

(56) References Cited

U.S. PATENT DOCUMENTS

| | | | | |
|---|---|---|---|---|
| 7,047,394 B1 * | 5/2006 | Van Dyke | ........... | G06F 9/30167 703/26 |
| 8,127,121 B2 * | 2/2012 | Yates, Jr. | ............ | G06F 9/30174 712/203 |
| 8,788,792 B2 * | 7/2014 | Yates, Jr. | ............ | G06F 9/30174 712/209 |
| 2003/0154359 A1 * | 8/2003 | Henry | ................. | G06F 9/30174 712/209 |
| 2003/0172252 A1 * | 9/2003 | Henry | ................. | G06F 9/30036 712/210 |
| 2003/0196077 A1 * | 10/2003 | Henry | ................. | G06F 9/30185 712/245 |
| 2008/0216073 A1 * | 9/2008 | Yates | ................... | G06F 9/30174 718/100 |
| 2009/0204785 A1 * | 8/2009 | Yates, Jr. | ............ | G06F 9/30174 711/205 |
| 2012/0149167 A1 * | 6/2012 | Yang | ................... | H01L 27/2409 438/382 |

* cited by examiner

*Primary Examiner* — Thai Q Phan
(74) *Attorney, Agent, or Firm* — Maschoff Brennan

(57) ABSTRACT

Computer-implemented systems, methods, and media are provided for emulating microprocessor instructions. The computer-implemented systems, methods, and media may, for example, identify an instruction of a first software application using a second software application that emulates instructions of a type of microprocessor, add an additional bit to a length of an operation code of the instruction to create an extended operation code, wherein the extended operation code is represented in an operation code table of the second software application, and emulate execution of the instruction using the second software application and the extended operation code.

20 Claims, 7 Drawing Sheets

*200*

*205*

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | Op. 0 | Op. 1 | Op. 2 | Op. 3 | Op. 4 | Op. 5 | Op. 6 | Op. 7 | Op. 8 | Op. 9 | Op. 10 | Op. 11 | Op. 12 | Op. 13 | Op. 14 | Op. 15 |
| 1 | Op. 16 | Op. 17 | Op. 18 | Op. 19 | Op. 20 | Op. 21 | Op. 22 | Op. 23 | Op. 24 | Op. 25 | Op. 26 | Op. 27 | Op. 28 | Op. 29 | Op. 30 | Op. 31 |
| 2 | Op. 32 | Op. 33 | Op. 34 | Op. 35 | Op. 36 | Op. 37 | Op. 38 | Op. 39 | Op. 40 | Op. 41 | Op. 42 | Op. 43 | Op. 44 | Op. 45 | Op. 46 | Op. 47 |
| 3 | Op. 48 | Op. 49 | Op. 50 | Op. 51 | Op. 52 | Op. 53 | Op. 54 | Op. 55 | Op. 56 | Op. 57 | Op. 58 | Op. 59 | Op. 60 | Op. 61 | Op. 62 | Op. 63 |
| 4 | Op. 64 | Op. 65 | Op. 66 | Op. 67 | Op. 68 | Op. 69 | Op. 70 | Op. 71 | Op. 72 | Op. 73 | Op. 74 | Op. 75 | Op. 76 | Op. 77 | Op. 78 | Op. 79 |
| 5 | Op. 80 | Op. 81 | Op. 82 | Op. 83 | Op. 84 | Op. 85 | Op. 86 | Op. 87 | Op. 88 | Op. 89 | Op. 90 | Op. 91 | Op. 92 | Op. 93 | Op. 94 | Op. 95 |
| 6 | Op. 96 | Op. 97 | Op. 98 | Op. 99 | Op. 100 | Op. 101 | Op. 102 | Op. 103 | Op. 104 | Op. 105 | Op. 106 | Op. 107 | Op. 108 | Op. 109 | Op. 110 | Op. 111 |
| 7 | Op. 112 | Op. 113 | Op. 114 | Op. 115 | Op. 116 | Op. 117 | Op. 118 | Op. 119 | Op. 120 | Op. 121 | Op. 122 | Op. 123 | Op. 124 | Op. 125 | Op. 126 | Op. 127 |
| 8 | Op. 128 | Op. 129 | Op. 130 | Op. 131 | Op. 132 | Op. 133 | Op. 134 | Op. 135 | Op. 136 | Op. 137 | Op. 138 | Op. 139 | Op. 140 | Op. 141 | Op. 142 | Op. 143 |
| 9 | Op. 144 | Op. 145 | Op. 146 | Op. 147 | Op. 148 | Op. 149 | Op. 150 | Op. 151 | Op. 152 | Op. 153 | Op. 154 | Op. 155 | Op. 156 | Op. 157 | Op. 158 | Op. 159 |
| A | Op. 160 | Op. 161 | Op. 162 | Op. 163 | Op. 164 | Op. 165 | Op. 166 | Op. 167 | Op. 168 | Op. 169 | Op. 170 | Op. 171 | Op. 172 | Op. 173 | Op. 174 | Op. 175 |
| B | Op. 176 | Op. 177 | Op. 178 | Op. 179 | Op. 180 | Op. 181 | Op. 182 | Op. 183 | Op. 184 | Op. 185 | Op. 186 | Op. 187 | Op. 188 | Op. 189 | Op. 190 | Op. 191 |
| C | Op. 192 | Op. 193 | Op. 194 | Op. 195 | Op. 196 | Op. 197 | Op. 198 | Op. 199 | Op. 200 | Op. 201 | Op. 202 | Op. 203 | Op. 204 | Op. 205 | Op. 206 | Op. 207 |
| D | Op. 208 | Op. 209 | Op. 210 | Op. 211 | Op. 212 | Op. 213 | Op. 214 | Op. 215 | Op. 216 | Op. 217 | Op. 218 | Op. 219 | Op. 220 | Op. 221 | Op. 222 | Op. 223 |
| E | Op. 224 | Op. 225 | Op. 226 | Op. 227 | Op. 228 | Op. 229 | Op. 230 | Op. 231 | Op. 232 | Op. 233 | Op. 234 | Op. 235 | Op. 236 | Op. 237 | Op. 238 | Op. 239 |
| F | Op. 240 | Op. 241 | Op. 242 | Op. 243 | Op. 244 | Op. 245 | Op. 246 | Op. 247 | Op. 248 | Op. 249 | Op. 250 | Op. 251 | Op. 252 | Op. 253 | Op. 254 | Op. 255 |

TECHNIQUES FOR EMULATING MICROPROCESSOR INSTRUCTIONS

FIELD OF THE DISCLOSURE

The present disclosure relates to computerized techniques for emulating microprocessor instructions, and more generally, to computer program technologies. By way of example, and without limitation, the present disclosure relates to computerized systems, methods, and media for adding an additional bit to an operation code to create an extended operation code that accounts for an operation state, and to utilize an extended operation code table that accounts for the extended operation code.

BACKGROUND OF THE DISCLOSURE

The use of electronic devices and software applications has grown significantly over the years. Today, a wide variety of different types of electronic devices are available. Software applications written for a particular type of electronic device are not always compatible with other electronic devices. For example, a software application may be written to be compatible with instructions for a particular type of microprocessor, which may not allow the software application to run on an electronic device using a different type of microprocessor. Moreover, software applications sometimes have problematic code, such as coding errors ("bugs"), or malicious code, such as viruses.

With so many different types of electronic devices, and so many potential problems with software applications, it can be desirable to run a software application with another software application that emulates the instructions for a particular type of microprocessor. For example, an electronic device with a first type of microprocessor may run a software application that emulates the instructions of a second type of microprocessor. This may allow the electronic device to run software applications designed to run on the second type of microprocessor by running the software applications through the emulation software. Moreover, this may allow the electronic device to run software applications that may have problematic code within the emulated environment in software, without risking having the code infect the electronic device's hardware. However, emulation software may require a lot of processing power and/or may be slow to run.

In view of the foregoing, it may be understood that there may be significant problems and shortcomings associated with techniques for emulating microprocessor instructions.

SUMMARY OF THE DISCLOSURE

Techniques for emulating microprocessor instructions are disclosed. In addition, the present disclosure provides for adding an additional bit to an operation code to create an extended operation code that accounts for an operation state, and to utilize an extended operation code table that accounts for the extended operation code.

In accordance with the present disclosure, there is provided a computer-implemented method for emulating microprocessor instructions. The method may comprise identifying, in a computing device, an instruction of a first software application using a second software application that emulates instructions of a type of microprocessor, wherein the instruction includes an instruction prefix. The method may also comprise adding, in the computing device, an additional bit to a length of an operation code of the instruction to create an extended operation code based on the instruction prefix, wherein the extended operation code, including the additional bit, is represented in an operation code table of the second software application. The method may further comprise emulating, in the computing device, execution of the instruction using the second software application and the extended operation code.

In accordance with other aspects of the disclosure, the additional bit is a first additional bit, and the method may further comprise adding, in the computing device, a second additional bit to the length of the operation code of the instruction to create the extended operation code, wherein the extended operation code, including the first additional bit and the second additional bit, is represented in the operation code table of the second software application.

In accordance with additional aspects of the disclosure, the operation code table may include more than 256 operation codes.

In accordance with further aspects of the disclosure, the operation code table may include 1024 operation codes.

In accordance with still further aspects of the disclosure, the instruction prefix may represent a size of an operand of the instruction.

In accordance with other aspects of the disclosure, the instruction prefix may represent a size of an address of the instruction.

In accordance with still other aspects of the disclosure, the instruction prefix may cause an operand of the instruction to be interpreted as having a 16-bit or 32-bit size.

In accordance with additional aspects of the disclosure, the instruction prefix may cause an address of the instruction to be interpreted as having a 16-bit or 32-bit size.

In accordance with other aspects of the disclosure, the operation code may be a byte in length, and the extended operation code may be at least 9 bits in length.

Furthermore, in accordance with the present disclosure, there is provided a computer-implemented system for emulating microprocessor instructions, the system comprising one or more memory devices that store instructions, and one or more computer processors that execute the instructions. The one or more computer processors may execute the instructions to identify an instruction of a first software application using a second software application that emulates instructions of a type of microprocessor, wherein the instruction includes an instruction prefix. The one or more computer processors may also execute the instructions to add an additional bit to a length of an operation code of the instruction to create an extended operation code based on the instruction prefix, wherein the extended operation code, including the additional bit, is represented in an operation code table of the second software application. The one or more computer processors may further execute the instructions to emulate execution of the instruction using the second software application and the extended operation code.

In accordance with still other aspects of the disclosure, the additional bit may be a first additional bit, and the one or more processors may further execute the instructions to add a second additional bit to the length of the operation code of the instruction to create the extended operation code, wherein the extended operation code, including the first additional bit and the second additional bit, is represented in the operation code table of the second software application.

In accordance with still other aspects of the disclosure, the operation code table may include at least 256 operation codes.

In accordance with further aspects of the disclosure, the operation code table may include 1024 operation codes.

In accordance with still further aspects of the disclosure, the instruction prefix may represent a size of an operand of the instruction.

In accordance with additional further aspects of the disclosure, instruction prefix may represent a size an address of the instruction.

In accordance with other aspects of the disclosure, the instruction prefix may cause an operand of the instruction to be interpreted as having a 16-bit or 32-bit size.

In accordance with further aspects of the disclosure, the instruction prefix may cause an address of the instruction to be interpreted as having a 16-bit or 32-bit size.

In accordance with other aspects of the disclosure, the operation code may be a byte in length, and the extended operation code may be at least 9 bits in length.

Additionally, in accordance with the present disclosure, there is provided a non-transitory computer-readable medium storing instructions that, when executed by one or more computer processors, causes the one or more computer processors to perform a method for emulating microprocessor instructions, wherein the method may comprise identifying an instruction of a first software application using a second software application that emulates instructions of a type of microprocessor, wherein the instruction includes an instruction prefix. The method may also comprise adding an additional bit to a length of an operation code of the instruction to create an extended operation code based on the instruction prefix, wherein the extended operation code, including the additional bit, is represented in an operation code table of the second software application. The method may further comprise emulating execution of the instruction using the second software application and the extended operation code.

In accordance with other aspects of the disclosure, the additional bit may be a first additional bit, and the method may further comprise adding a second additional bit to the length of the operation code of the instruction to create the extended operation code, wherein the extended operation code, including the first additional bit and the second additional bit, is represented in the operation code table of the second software application.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate understanding of the present disclosure, reference is now made to the accompanying drawings, in which like elements are referenced with like numerals. These drawings should not be construed as limiting the present disclosure, but are intended to be illustrative only.

FIG. 2 illustrates a representation of an example operation code table, consistent with embodiments of the present disclosure.

DETAILED DESCRIPTION OF EXAMPLE EMBODIMENTS

Figure 1:
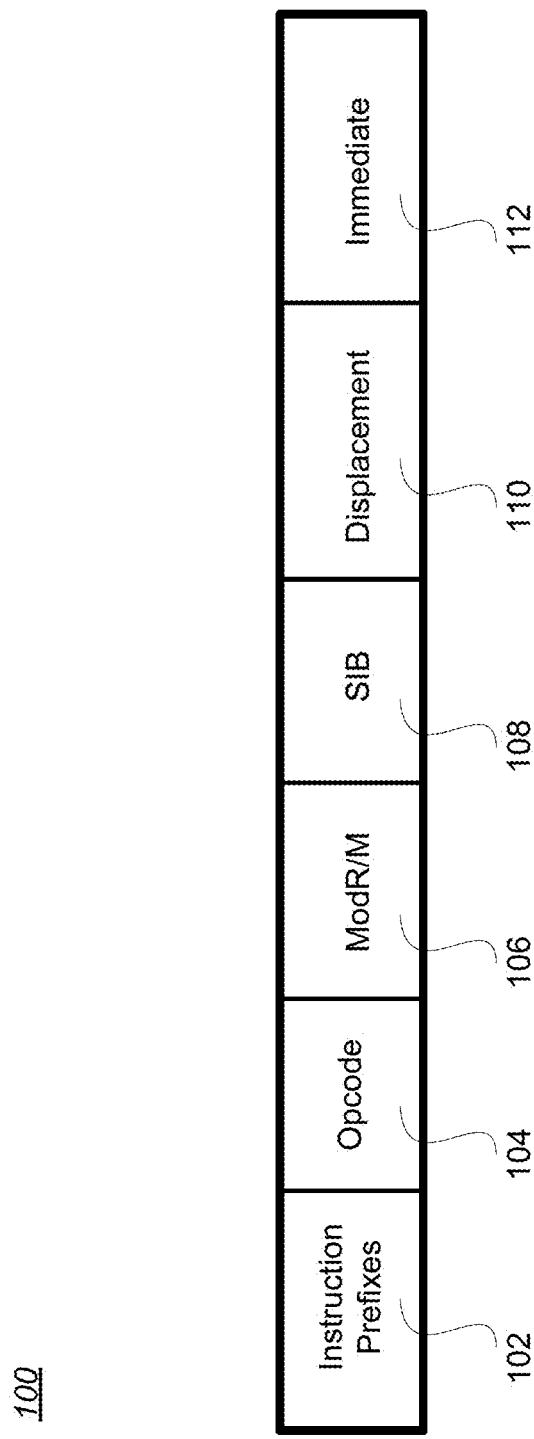
FIG. 1 illustrates an example instruction format for a microprocessor, consistent with embodiments of the present disclosure.

Reference will now be made in detail to the present embodiments of the disclosure, certain examples of which are illustrated in the accompanying drawings.

Embodiments of the present disclosure relate to computerized systems, methods, and media for emulating microprocessor instructions. Embodiments of the present disclosure include computerized systems, methods, and media that may add an additional bit to an operation code to create an extended operation code that accounts for an operation state, and to utilize an extended operation code table that accounts for the extended operation code.

The use of electronic devices and software applications has grown significantly over the years. Today, a wide variety of different types of electronic devices are available. Software applications written for a particular type of electronic device are not always compatible with other electronic devices. For example, a software application may be written to be compatible with instructions for a particular type of microprocessor, which may not allow the software application to run on an electronic device using a different type of microprocessor. Moreover, software applications sometimes have problematic code, such as coding errors ("bugs"), or malicious code, such as viruses.

With so many different types of electronic devices, and so many potential problems with software applications, it can be desirable to run a software application with another software application that emulates the instructions for a particular type of microprocessor. For example, an electronic device with a first type of microprocessor may run a software application that emulates the instructions of a second type of microprocessor. This may allow the electronic device to run software applications through the emulation software. Moreover, this may allow the electronic device to run software applications that may have problematic code within the emulated environment in software, without risking having the code infect the electronic device's hardware.

An emulator may be hardware or software that enables a first computing device to behave like, or emulate, a second computing device. For example, an emulator may enable a first computing device to run software designed for the second computing device. An emulator may accomplish this by emulating the instructions of the type of microprocessor utilized by the second computing device. For example, an emulator on a computing device may follow the execution flow of a software application, and for every machine code instruction encountered, may execute operations on the computing device in a manner that emulates the way the operations would have been performed by the microprocessor for which the software application was written. This may be accomplished by assigning variables for registers and flags of the simulated microprocessor, and by then translating the logic of the simulated microprocessor into software algorithms to mirror the implementation of the microprocessor.

A microprocessor, sometimes referred to as a central processing unit ("CPU"), may be a multipurpose, programmable, computer processor that accepts digital data as input, processes it according to machine instructions stored in its memory, and provides results as output. Different types of microprocessors may use different instruction formats. An example instruction format 100 for a microprocessor, such as an Intel® IA-32 architecture microprocessor, is illustrated in FIG. 1. Instruction format 100 may include an instruction prefix portion 102, an operation code (also referred to as "opcode") portion 104, a ModR/M portion 106, a SIB portion 108, a Displacement portion 110, and/or an Immediate portion 112. One or more of the aforementioned portions may be optional. Each portion of an instruction may be represented by one or more bits of data. In some embodiments, one or more of the portions may each be represented by one or more bytes of data. A prefix portion, such as prefix portion 102, may be used to change a meaning of a machine instruction. For example, an operand-override prefix portion may allow a software program to switch between using 16-bit and 32-bit operand sizes. As another example, an address-size override prefix portion may allow a software program to switch between 16-bit and 32-bit addressing sizes.

An operation code portion, such as operation code portion 104, may specify one or more operation codes, each of which may specify one or more operations to be performed by the microprocessor. For example, a one byte operation code may represent up to $2^8$, or 256, different operation codes, each of which may specify one or more operations that can be performed by a microprocessor. FIG. 2 illustrates a representation 200 of an example operation code table representing 256 different operation codes. As shown in representation 200, each unique combination of bits in a one byte operation code may represent a distinct operation code illustrated in a cell, such as operation code 0 in cell 205. In representation 200, each unique combination of bits is represented in hexadecimal format, with the numbers for the columns representing the hexadecimal number for the least significant digit, and the numbers for the rows representing the hexadecimal number for the most significant digit (e.g., hexadecimal 0F corresponds to operation code 15).

Some microprocessor architectures, such as the Intel® IA-32 architecture, may support operation codes that are one byte, two bytes, or three bytes in length. For example, operation code 15 (or 0F in hexadecimal) of the Intel® IA-32 architecture may operate as an escape to two byte operation code format. The two byte operation codes may correspond to a different table of 256 operation codes. For example, in hexadecimal, each of these two byte operation codes may be referenced by first referencing operation code 15 (or 0F in hexadecimal), and then referencing the operation code in the two byte operation code table. In this example, to reference operation code 03 (in hexadecimal) in the two byte operation code table, the instruction may include operation code 0F 03. Similarly, an additional 256 operation code table may be referenced with some other combination of three bytes of data (e.g., two bytes that indicate that the three byte operation code table should be referenced, followed by an additional byte that references an operation code in the three-byte operation code table).

Some instructions may refer to an operand in memory that has an addressing-form specifier portion, which may be called a ModR/M portion, such as ModR/M portion 106 of instruction 100. This portion may contain three fields of information, a mod field that combines with a r/m field to form 32 possible values including eight registers and 24 addressing modes, a reg/opcode field that specifies either a register number or more bits of operation code information, and an r/m field that can specify a register as an operand or that can be combined with the mod field to encode an addressing mode. Certain encodings of the ModR/M field may require a second addressing portion, which may be called a SIB portion, such as SIB portion 108 of instruction 100. Some addressing forms may also include a displacement portion, such as displacement portion 110. Some instructions may also specify an immediate portion, such as immediate portion 112.

Microprocessor instructions may have slightly different meanings depending on the values in the various portions of the instructions. In attempting to emulate microprocessor instructions in emulation software, the emulation software is often written to account for these various meanings by setting states in variables and then evaluating a number of conditional statements, such as if-then statements, based on the states set in the variables to identify which coding branch to follow in the code. For example, the emulator software may have to determine whether a variable stores a state indicating that the software is emulating a 16-bit addressing mode or a 32-bit addressing mode before evaluating the modR/M portion of the instruction. Similarly, the emulator software may have to determine whether a variable stores a state indicating that the software is emulating a 16-bit operand mode or a 32-bit operand mode before evaluating certain portions of the instruction. However, evaluating all of these conditional statements may slow the speed of the emulation software, which may in turn cause the software application the emulation software is running to execute slowly.

Embodiments of the present disclosure can address the challenges associated with emulating microprocessor instructions. For example, embodiments of the present disclosure provide computerized systems, methods, and media that may emulate microprocessor instructions with less conditional statements and/or branches in the emulation software code. In some embodiments, the emulation software may provide one or more extended operation code tables that represent extended operation codes. The extended operation codes may be operation codes to which one or more bits are added to account for various program states, such as an addressing state or an operand size state. For example, rather than having to identify whether the emulation software is emulating a 16-bit or 32-bit addressing mode before reading an instruction, the emulation software can add a bit to one or more operation codes of the software application being emulated to create an extended operation code that accounts for the addressing mode. This extended operation code can then be used to reference an operation in the extended operation code table, and the operation for this extended operation code can be written specifically for the particular addressing mode state referenced in the extended operation code. Thus, the number of conditional statements and/or branches in the emulator software code can be reduced, thereby enhancing the performance of the emulation software.

The computer-implemented methods disclosed herein may be executed, for example, by one or more computer processors that receive instructions from one or more non-transitory computer-readable mediums. Similarly, systems consistent with the present disclosure may include at least one computer processor and memory, and the memory may be a non-transitory computer-readable medium.

As used herein, a non-transitory computer-readable medium refers to any type of physical memory on which information or data readable by a computer processor may be stored. Examples include random access memory (RAM), read-only memory (ROM), volatile memory, non-volatile memory, hard drives, compact disc ROMs (CD ROMs), digital versatile discs (DVDs), flash drives, magnetic strip storage, semiconductor storage, optical disc storage, magneto-optical disc storage, and/or any other known physical storage medium. Singular terms, such as "memory" and "computer-readable storage medium," may additionally refer to multiple structures, such as a plurality of memories and/or computer-readable storage mediums.

As used herein, a "memory" may comprise any type of computer-readable storage medium unless otherwise specified. A computer-readable storage medium may store instructions for execution by one or more processors, including instructions for causing the one or more computer processors to perform steps or stages consistent with embodiments disclosed herein. Additionally, one or more computer-readable storage mediums may be utilized in implemented a computer-implemented method.

As used herein, the indefinite articles "a" and "an" mean "one or more" in open-ended claims containing the transitional phrase "comprising," "including," and/or "having."

Figure 3:
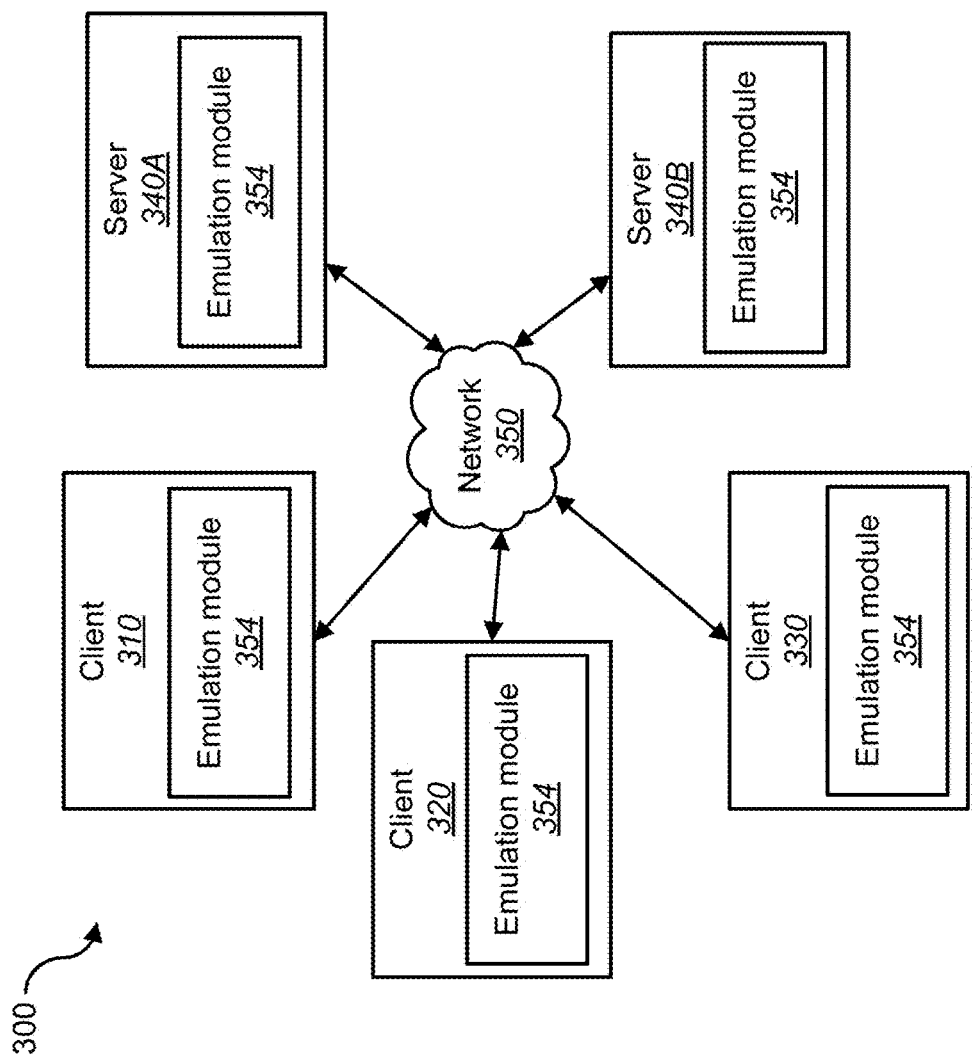
FIG. 3 illustrates a block diagram of an example computing environment for implementing embodiments and features consistent with the present disclosure.

FIG. 3 shows a block diagram depicting an example computing environment 300 for implementing embodiments and features of the present disclosure. The arrangement and number of components in computing environment 300 is provided for purposes of illustration. Additional arrangements, number of components, and other modifications may be made, consistent with the present disclosure.

Figure 4:
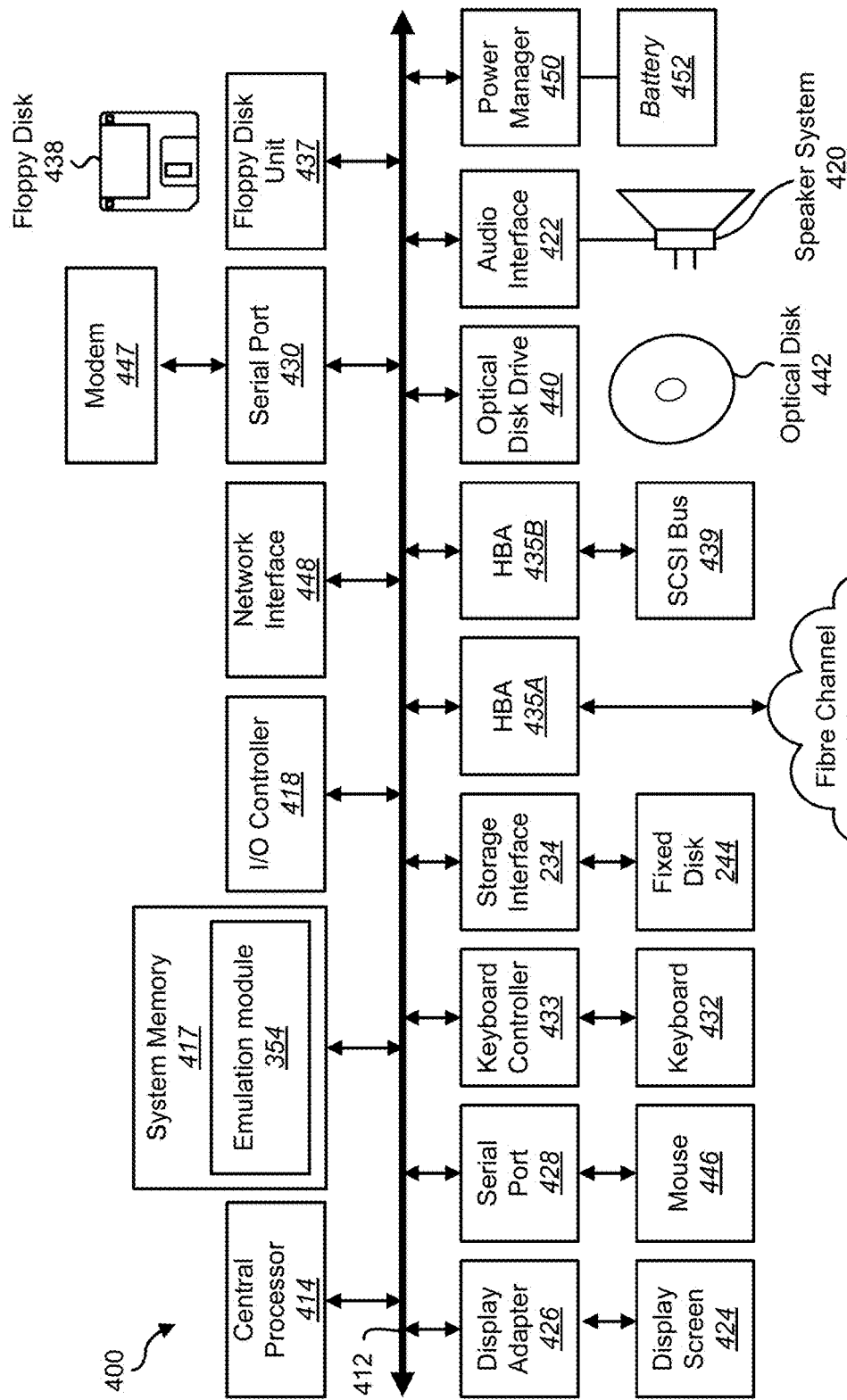
FIG. 4 illustrates a block diagram of an example computer system for implementing embodiments and features consistent with the present disclosure.

As shown in FIG. 3, computing environment 300 may include one or more clients 310, 320, 330, as well as one or more servers 340A, 340B (one or more of each of which may be implemented using computer system 400 shown in FIG. 4). One or more of clients 310, 320, 330 may be communicatively coupled to one or more networks 350.

With reference to computer system 400 of FIG. 4, modem 447, network interface 448, and/or some other network connection may be used to provide connectivity from one or more of client systems 310, 320, 330 to network(s) 350. One or more of client systems 310, 320, 330 may access information on one or more servers 340A, 340B using, for example, a web browser, antivirus software, or other client software (not shown). Such software may allow one or more of client systems 310, 320, 330 to access data hosted by one or more servers 340A, 340B.

One or more networks 350 may include one or more types of networks interconnecting any of client devices 310, 320, 330, server(s) 340A, 340B, and/or other devices communicatively coupled to network(s) 350. Network(s) 350 may include one or more wide area networks (WANs), metropolitan area networks (MANs), local area networks (LANs), personal area networks (PANs), or any combination of these networks. Network(s) 350 may include a combination of any one or more of a variety of different network types, including Internet, intranet, Ethernet, cellular, satellite, twisted-pair, coaxial cable, fiber optic, IEEE 802.11, wireless local area network (WLAN), WiFi, terrestrial, Bluetooth, infrared, and/or other types of wired or wireless networks. Network(s) 350 may include one, or any number, of the exemplary types of networks mentioned above operating as a stand-alone network or in cooperation with each other. Network(s) 350 may utilize one or more protocols of one or more clients or servers to which they are communicatively coupled. Network(s) 350 may translate to or from one or more other protocols of network devices. Although network(s) 350 are depicted as one network, it should be appreciated that according to one or more embodiments, network(s) 350 may comprise a plurality of interconnected networks.

Computing environment 300 may also include one or more clients 310, 320, 330. A client may be a mobile phone, smart phone, tablet, netbook, electronic reader, personal digital assistant (PDA), personal computer, laptop computer, smart watch, gaming device, desktop computer, set-top box, television, personal organizer, portable electronic device, smart appliance, navigation device, server, and/or other type of computing device. Client(s) 310, 320, 330 may receive data from user input, a database, a file, a web service, an antivirus service and/or an application programming interface. In some embodiments, a client may be implemented with hardware devices and/or software applications running thereon. An individual may use a client to communicate with server(s) 340A, 340B, and/or another client over network(s) 350. A client may communicate by transmitting data to and/or receiving data from server(s) 340A, 340B, and/or another client. In one embodiment, one or more client devices 310, 320, 330 may be implemented using a computer system, such as computer system 400 of FIG. 4. Although a plurality of clients 310, 320, 330 are illustrated in FIG. 3, the disclosure is not so limited. Any one or more of these clients may be utilized in a computing environment for implementing embodiments and features of the present disclosure. Moreover, one of skill in the art would recognize that a computing environment for implementing embodiments and features of the present disclosure may include more client devices than depicted in FIG. 3.

Computing environment 300 may also include one or more servers 340A, 340B. By way of example, server(s) 340A, 340B may include any combination of one or more web servers, databases, mainframe computers, general-purpose computers, personal computers, application servers, archival platforms, backup servers, network storage devices, media servers, email servers, document management platforms, enterprise search servers, routers, or other types of computing devices. One or more of servers 340A, 340B may utilize one or more of storage devices, such as one of the storage devices described with respect to computer system 400, for the storage of application data, emulation software, software applications, backup data, or other data. One or more servers 340A, 340B may be hosts, such as application servers, which may process data traveling between one or more clients 310, 320, 330 and a backup platform, a backup process, and/or storage. In certain embodiments, one or more servers 340A, 340B may be a standalone computing system or apparatus, or may be part of a larger system. For example, server(s) 340A, 340B may represent distributed servers that are remotely located and communicate over a communications network, or over a dedicated network, such as a local area network (LAN). Server(s) 340A, 340B may include one or more back-end servers for carrying out one or more aspects of the present disclosure.

Server(s) 340A, 340B may be implemented as a server system comprising a plurality of servers, or a server farm comprising a load balancing system and a plurality of servers. In some embodiments, a server 340A, 340B may be implemented with hardware devices and/or software applications running thereon. A server 340A, 340B may communicate with one or more client devices 310, 320, 330 over network(s) 350. For example, a server 340A, 340B may communicate by transmitting data to and/or receiving data from one or more client devices 310, 320, 330. In some embodiments, one or more servers 340A, 340B may be implemented using a computer system, such as computer system 400 of FIG. 4. Although a plurality of servers 340A, 340B are illustrated in FIG. 3, the disclosure is not so limited. Any one or more of these servers may be utilized in a computing environment for implementing embodiments and features of the present disclosure. Moreover, one of skill in the art would recognize that a computing environment for implementing embodiments and features of the present disclosure may not include any of servers 340A, 340B, or may include more servers than depicted in FIG. 3.

According to some embodiments, one or more clients 310, 320, 330 and/or one or more server(s) 340A, 340B may contain one or more portions of software for implementation of emulating microprocessor instructions, such as, for example, emulation module 354. Further, one or more portions of emulation module 354 may reside at a network centric location. For example, one or more of servers 340A, 340B may be a server, firewall, gateway, router, or other network element that may perform one or more actions to support management of network and security elements. According to some embodiments, network(s) 350 may include an external network and one or more servers 340A, 340B may be a gateway or firewall between one or more internal components and clients and the external network. According to some embodiments, emulation module 354 may be implemented as part of a cloud computing environment.

FIG. 4 shows a block diagram illustrating an example computer system 400 that may be used for implementing embodiments consistent with the present disclosure, including the example systems and methods described herein. Computer system 400 may be used to implement one or more client devices of computing environment 300, such as client devices 310, 320, 330, and/or one or more servers of computing environment 300, such as servers 340A, 340B. The arrangement and number of components in computer system 400 is provided for purposes of illustration. Additional arrangements or other modifications may be made, consistent with the present disclosure. For example, computer system 400 may include fewer or more components than illustrated in FIG. 4.

As illustrated in FIG. 4, computer system 400 may include a bus 412 which may interconnect major subsystems of computer system 400, such as one or more central processors 414, one or more system memories 417 (e.g., any combination of RAM (Random Access Memory), ROM (Read Only Memory), flash RAM, or the like, one or more Input/Output (I/O) controllers 418, one or more external audio devices, such as a speaker system 420 via an audio output interface 422, one or more external devices, such as a display screen 424 via display adapter 426, one or more serial ports 428, 430, one or more keyboards 432 (which may be interfaced via a keyboard controller 433), one or more storage interfaces 434, one or more floppy disk drives 437 operative to receive a floppy disk 438, one or more host bus adapter (HBA) interface cards 435A operative to connect with a Fibre Channel network 490, one or more host bus adapter (HBA) interface cards 435B operative to connect to a SCSI bus 439, and one or more optical disk drives 440 operative to receive an optical disk 442. Also included may be one or more mouse devices 446 (or other point-and-click devices, which may be coupled to bus 412 via a serial port 428), one or more modems 447 (which may be coupled to bus 412 via serial port 430), one or more network interfaces 448 (which may be coupled directly to bus 412), one or more power managers 450, and one or more batteries 452.

Central processor(s) 414 may include one or more computer processors for executing instructions. When executing the instructions, central processor(s) 414 may be configured to carry out the embodiments and features of the present disclosure. Processors suitable for the execution of instructions include, by way of example, both general and special purpose microprocessors, and any one or more processors of any kind of digital computer.

A computer system 400 may include one or more storage devices configured to store data and/or software instructions used by central processor(s) 414 to perform operations consistent with disclosed embodiments. For example, one or more system memories 417 may be configured to store one or more software programs that, when executed by central processor(s) 417, cause central processor(s) 417 to perform functions or operations consistent with disclosed embodiments, such as, for example, emulation module 354. By way of example, a system memory 417 may include one or more of NOR flash memory devices, NAND flash memory devices, ROM devices, RAM devices, etc. Computer system 400 may also include one or more storage mediums, such as a fixed disk 444, optical disk 442, floppy disk 438, hard drive, solid state drive, tape drive, redundant array of independent disks (RAID) arrays, etc. Although FIG. 4 illustrates only one system memory 417, a computer system 400 may include any number of system memories 417. Similarly, more or less storage mediums could be included in a computer system 400 than are illustrated in FIG. 4.

One or more busses 412 may allow data communication between central processor(s) 414 and one or more system memories 417. As previously noted, system memory 417 may include RAM, which may be the main memory into which the operating system and application programs are loaded. Additionally or alternatively, a system memory 417 may include ROM or flash memory, which may contain, among other code, a Basic Input-Output system (BIOS) which controls basic hardware operation, such as the interaction with peripheral components. Applications resident with computer system 400 may be stored on and accessed via one or more computer readable mediums, such as a hard disk drive (e.g., fixed disk 444), an optical drive (e.g., optical drive 440), a floppy disk unit 437, a removeable disk unit (e.g., Universal Serial Bus (USB) drive), or other storage medium. According to some embodiments, a credential manager 454 may be resident in a system memory 417. In some embodiments, a portion of a emulation module 354 may be resident in one system memory 417, and another portion of the emulation module 354 may be resident in another system memory 417. A storage interface 434, as with other storage interfaces of computer system 400, may connect to a standard computer readable medium for storage and/or retrieval of information, such as a fixed disk drive 444. A fixed disk drive 444 may be a part of computer system 400 or may be separate and accessed through other interface systems. A modem 447 may provide a direct connection to a remote server via a telephone link or to the Internet via an Internet service provider (ISP). A network interface 448 may provide a direct connection to a remote server via a direct network link to the Internet via a POP (point of presence). Network interface 448 may provide such a connection over any of the types of networks described above with respect to network(s) 350.

Many other devices or subsystems (not shown) may be connected in a similar manner (e.g., document scanners, digital cameras, and so on). Conversely, all of the devices shown in FIG. 4 need not be present to practice the present disclosure. The devices and subsystems can be interconnected in different ways from that shown in FIG. 4. Code to implement the present disclosure may be stored in computer-readable storage media such as one or more system memories 417, fixed disks 444, optical disks 442, or floppy disks 438. Code to implement the present disclosure may also be received via one or more interfaces and stored in memory. Computer system 400 may include an operating system, such as MS-DOS®, MS-WINDOWS®, OS/2®, OS X®, UNIX®, Linux®, or another known operating system.

One or more power managers 450 may monitor a power level of one or more batteries 452. Power manager(s) 450 may provide one or more application programming interfaces (APIs) to allow determination of a power level, a time window remaining prior to shutdown of computer system 400, a power consumption rate, an indicator of whether computer system 400 is on mains power (e.g., AC Power) or battery power, and other power-related information. According to some embodiments, APIs of power manager 450 may be accessible remotely (e.g., accessible to a remote backup management module via a network connection). According to some embodiments, one or more batteries 452 may include an Uninterruptible Power Supply (UPS) located either local to or remote from computer system 400. In such embodiments, power manager(s) 450 may provide information about a power level of a UPS.

Figure 5:
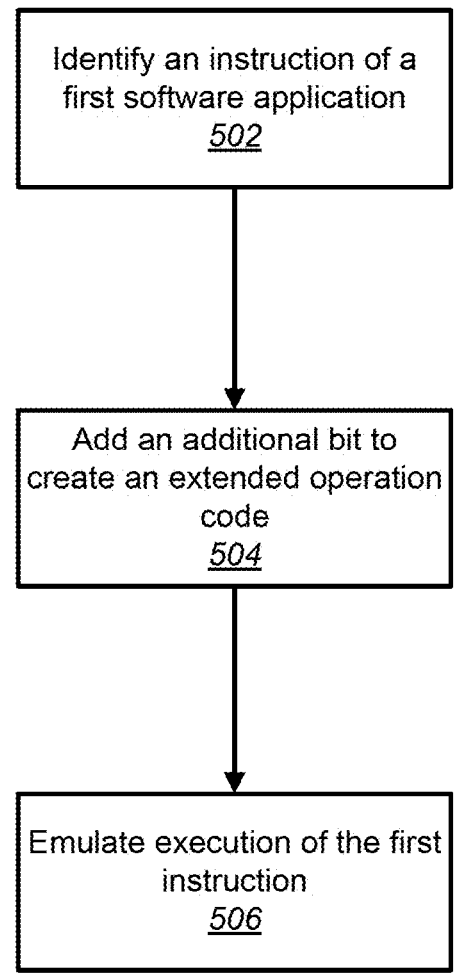
FIG. 5 illustrates a flowchart of an example method for emulating a microprocessor instruction, consistent with embodiments of the present disclosure.

FIG. 5 illustrates a flowchart of an example method 500, consistent with embodiments of the present disclosure. Example method 500 may be implemented in a computing environment (see, e.g., FIG. 3) using one or more computer systems (see, e.g., FIG. 4). In some embodiments, method 500 may be performed by one or more clients 310, 320, 330, or by one or more servers 340A, 340B.

Prior to method 500 beginning, an emulation software application may be launched. In some embodiments, the emulation software application may have been received over network(s) 350 from a server 340A, 340B. In some embodiments, the emulation software application may be received over network(s) 350 from security service provider, such as an antivirus service provider, managing one or more of servers 340A, 340B. The emulation software application may emulate operating instructions of a particular type of microprocessor. In some embodiments, the emulation software may emulate operating instructions of an Intel® IA-32 or Advanced Micro Devices® (AMD®) AMD64 microprocessor architecture, though the disclosure is not so limited. The emulation software may emulate execution of a software application on the particular type of microprocessor the emulation software is emulating. For example, the emulation software, when executed by one or more processors, such as central processor 414, may accomplish this by following the execution flow of the software application being emulated and, for every machine code instruction encountered, executing operations on the central processor 414 that are semantically equivalent to the original instructions in the emulated software application. In another embodiment, the emulator software, when executed by one or more processors, such as central processor 414, may emulate execution of a software application by using dynamic recompilation, such as a just in time compiler technique. For example, when the execution flow of the emulated software application jumps into a location containing untranslated code, the emulator software may then translate a block of code into code that can be executed. Once the emulator software has been launched and execution of a software application has begun to be emulated by the emulator software, method 500 may begin.

In step 502 of method 500, an instruction of the software application being emulated by the emulation software is identified. In some embodiments, the instruction may have a format for a particular type of microprocessor, such as an Intel® IA-32 architecture processor an AMD® AMD64 processor. An example instruction format is illustrated in FIG. 1. The instruction may have an operation code portion, such as operation code portion 104, and one or more additional optional portions. In some embodiments, the operation code portion 104 may include a one byte operation code, a two byte operation code, or a three byte operation code. The optional portions may include one or more instruction prefix portions, such as instruction prefix portions 102, a ModR/M portion, such as ModR/M portion 106, a SIB portion, such as SIB portion 108, a Displacement portion, such as Displacement portion 110, and/or an Immediate portion, such as Immediate portion 112. In some embodiments, the instruction prefix portions may include up to four instruction prefixes, each of which may be one byte in length. In some embodiments, the ModR/M portion may be one byte in length. In some embodiments, the SIB portion may be one byte in length. In some embodiments, the Displacement portion may be one, two, three, or four bytes in length. In some embodiments, the Immediate portion may be one, two, three, or four bytes in length.

In some microprocessors, the operation code of an instruction, such as operation code 104, corresponds to one or more operations in an operation code table for the microprocessor to perform. For example, a one byte operation code with a specific allocation of bits in the byte may correspond to one operation code in the operation code table, which may represent one or more operations for the microprocessor to perform. Because there are 256 ($2^8$=256) different bit combinations in a byte, a one byte operation code may represent any one of 256 possible operation codes, depending on the allocation of bits in the byte. FIG. 2 illustrates an example of a representation 200 of an example operation code table representing 256 different operation codes. As shown in representation 200, each unique combination of bits in a one byte operation code may represent a distinct operation code illustrated in a cell, such as operation code 0 in cell 205. In representation 200, each unique combination of bits is represented in hexadecimal format, with the numbers for the columns representing the hexadecimal number for the least significant digit of the operation code, and the numbers for the rows representing the hexadecimal number for the most significant digit of the operation code (e.g., hexadecimal 0F corresponds to operation code 15). In the Intel® IA-32 microprocessor architecture, for example, operation code 00 (in hexadecimal) may correspond to an ADD with operands Eb Gb.

The first byte of a two byte operation code may reference one of the 256 operation codes in the one byte operation code table that indicates that a separate operation code table should be referenced. For example, in the Intel® IA-32 microprocessor architecture, operation code 15 (or 0F in hexadecimal) may indicate an "escape" to a two byte operation code table. An example of a two byte operation code may be 0F 07 (in hexadecimal), where "0F" indicates that the two-byte operation code table should be referenced, and "07" indicates that operation code 7 in the two-byte operation code table should be referenced. Like the one byte operation code table, the two byte operation code table may also include 256 operation codes.

Similarly, a three byte operation code may include two bytes that together indicate that a three-byte operation code table should be referenced, with the third byte indicating the operation code within the three-byte operation code table to reference. Like the one byte and two byte operation code tables, the three byte operation code table may also include 256 operation codes. Thus, a microprocessor, such as an Intel® IA-32 architecture microprocessor, may have three different operation code tables (a one byte operation code table, a two byte operation code table, and a three byte operation code table), each of which may have 256 different operation codes.

Some of the operation codes in an operation code table may act as a prefix. For example, in an Intel® IA-32 microprocessor architecture, operation code 66 (in hexadecimal) may correspond to an operand size override prefix, and may be used to switch between operand sizes, such as between 16-bit and 32-bit operand sizes. In the Intel® IA-32 microprocessor architecture, certain instructions using a three-byte sequence of primary operation code bytes may use operation code 66 (in hexadecimal) to express distinct functionality. As another example, in an Intel® IA-32 microprocessor architecture, operation code 67 (in hexadecimal) may correspond to an address size override prefix, which may be used by a program to switch between addressing sizes, such as between a 16-bit and 32-bit addressing size.

Emulator software may attempt to emulate instructions of a particular type of microprocessor by including a 256 operation code table corresponding to each of the one byte, two byte, and three byte operation codes. The emulator software may then handle differences in the way instructions would have been interpreted by the microprocessor for which they were written by using conditional statements and/or coding branches.

Embodiments of the disclosure herein reduce the number of conditional statements and/or coding branches in emulator software by utilizing extended operation code tables, and extended operation codes. For example, in step 504, an additional bit may be added to a length of one or more operation codes of the instructions of a software application being emulated to account for a particular state. An extended operation code table may then be utilized to emulate execution of the instruction, so that one or more conditional statements and/or coding branches may be avoided. As an example, the emulator software may add an additional bit to each of the operation codes in the software application being emulated to account for a state set by a prefix, such as an address size. As one example, the additional bit may be set to zero for a 16-bit addressing mode, or 1 for a 32-bit addressing mode, or vice versa. Thus, an additional bit may be added to each operation code occurring after a prefix in the execution flow of the software application being emulated to account for the addressing size state set by the prefix. When another prefix changing the addressing mode is encountered, the additional bit added to each operation code occurring in the execution flow after the prefix may reflect the new addressing mode state. Thus, an additional bit, either 0 or 1, is added to each operation code in the software application machine code to account for a particular state that the microprocessor for which the application was written would have been in at that point in the code.

An extended operation code table may be provided by the emulation software to account for each of the extended operation codes. For example, a nine bit extended operation code may have 512 different combinations ($2^9$=512). To account for the additional bit, an extended table of 512 operation codes may be provided. That is, two different operation codes may be provided for each of the 256 operation codes that would typically be provided, one of which would correspond to one of the two states of the additional bit (e.g., a 16-bit addressing size mode), and the other of which would correspond to the other of the two states of the additional bit (e.g, a 32-bit addressing size mode).

In some embodiments, more than one additional bit may be added by the emulation software to each of the operation codes in the emulated software application machine code. For example, one additional bit may be added to account for an addressing size mode, as discussed above, and a second additional bit may be added to account for an operand size mode set by a prefix. Thus, in an emulator software emulating instructions of an Intel® IA-32 architecture microprocessor, one bit may be added to operation codes to account for address size states set by prefix 67 (in hexadecimal), and a second bit may be added to the operation codes to account for operand size states set by prefix 66 (in hexadecimal). That is, a first bit may be added to each operation code occurring after a prefix, such as prefix 67 (in hexadecimal), in the code of the software application being emulated to account for the addressing size state set by the prefix, and a second bit may be added to each operation code occurring after a prefix, such as prefix 66 (in hexadecimal), in the code of the software application to account for the operand size state set by the prefix. When another prefix changing the addressing mode or operand size mode is encountered, the additional bit added to each operation code occurring after the prefix may reflect the new addressing size state or operand size state, respectively. Thus, either 00, 01, 10, or 11 may be added to each operation code in the software application machine code to account for the particular states (e.g., addressing size state and operand size state) the microprocessor for which the application was written would have been in at that point in the code.

Figure 6:
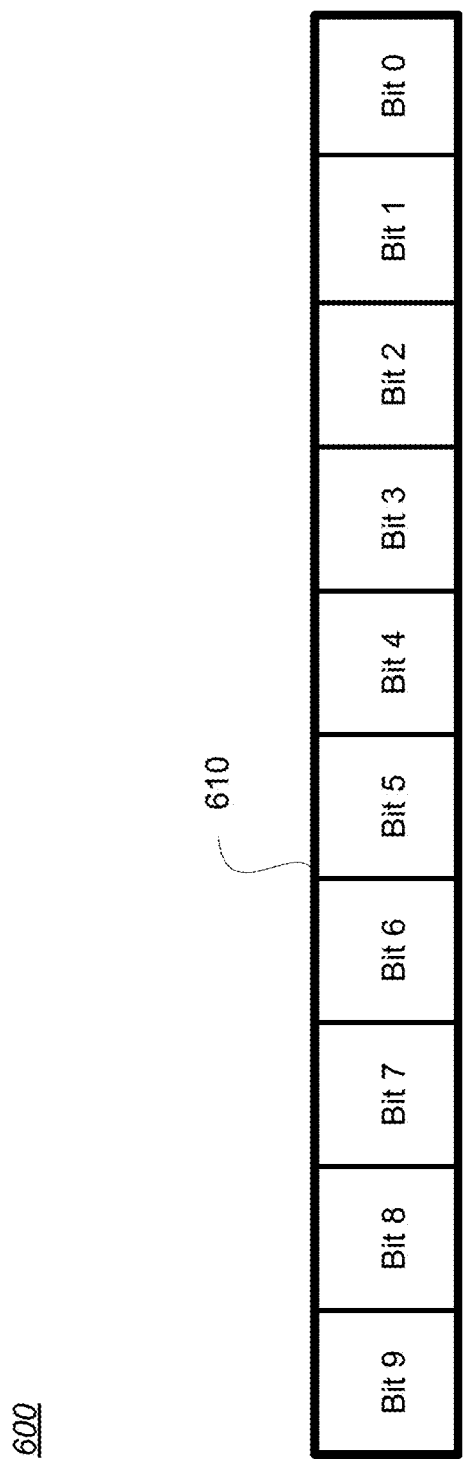
FIG. 6 illustrates an example of an extended operation code, consistent with embodiments of the present disclosure.

FIG. 6 illustrates an example 600 of an extended operation code 610, consistent with embodiments of the present disclosure. In the example of FIG. 6, two additional bits have been added to an operation code of a software application's machine instructions to account for two different states, such as addressing size state and operand size state. For example, if bit 8 is added to account for an addressing size state, bit 8 may be added as a 0 or 1 to each of the operation codes in the software application's machine instructions to account for an addressing size state (e.g., 16-bit or 32-bit state) set by the last addressing size prefix, such as prefix 67 (in hexadecimal), in the software application's machine code. As another example, if bit 9 is added to account for an operand size state, bit 9 may be added as a 0 or 1 to each of the operation codes in the software application's machine instructions to account for an operand size state (e.g., 16-bit state or 32-bit state) set by the last operand size prefix, such as prefix 66 (in hexadecimal), in the software application's machine code. Although bits 8 and 9 are discussed above, one of ordinary skill would recognize that any of bits 0-9 could be one of the additional bits representing a state, such as the addressing size state or the operand size state.

Figure 7:
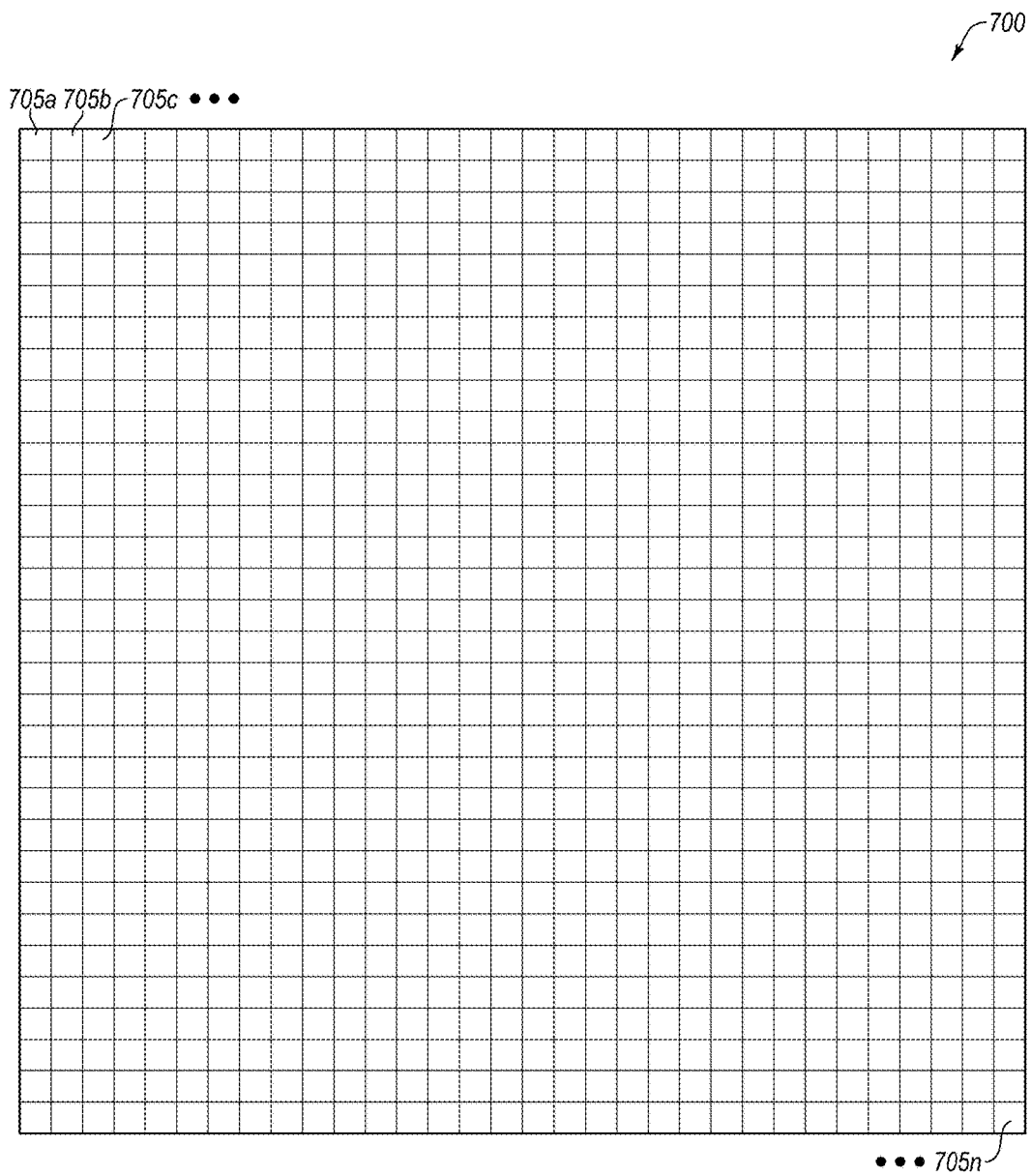
FIG. 7 illustrates a representation of an additional example operation code table, consistent with embodiments of the present disclosure.

An extended operation code table may be provided by the emulation software to account for each of the extended operation codes. For example, a 10 bit extended operation code, such as operation code 610 of FIG. 6, may have 1,024 ($2^{10}$=1,024) different combinations. To account for the two additional bits, an extended table of 1,024 operation codes may be provided. That is, four different operation codes may be provided for each of the 256 operation codes that would typically be provided. For example, if one of the bits corresponds to an addressing size, and the other bit corresponds to an operand size, the two additional bits 00 may represent an operand size of 16-bits and an addressing size of 16-bits for each of the 256 operation codes. Similarly, the two additional bits 01 may represent an operand size of 16-bits and an addressing size of 32-bits for each of the 256 operation codes. Likewise, the two additional bits 10 may represent an operand size of 32-bits and an addressing size of 16-bits for each of the 256 operation codes. Similarly, the two additional bits 11 may represent an operand size of 32-bits and an addressing size of 32-bits for each of the 256 operation codes. An example representation 700 of an extended operation code table for an extended operation code of 10 bits is illustrated in FIG. 7. As shown in representation 700, 1,024 different cells 705a, b, c . . . n are represented, each of which may correspond to a different extended 10-bit operation code.

Returning to method 500 of FIG. 5, once one or more additional bits have been added to an operation code in an instruction in the emulated software application's machine code, execution of the instruction may be emulated through use of the extended operation code (the operation code plus the added bits). Thus, for each additional bit, a state of the microprocessor being emulated may be accounted for in the operation code itself, thereby removing the need for some of the conditional statements and/or coding branches that would have been used for handling different state scenarios.

Although method 500 includes, in step 502, identifying an instruction of a first software application, in step 504, adding an additional bit to create an extended operation code, and in step 506, emulating execution of the instruction, the disclosure is not so limited. For example, as noted above, one or more (e.g., two) additional bits may be added in step 504 to create an extended operation code. Moreover, steps 502 and 504 may be iteratively performed to add one or more additional bits to multiple operation codes of multiple instructions before step 506 is performed for any of the instructions.

Although addressing size states and operand size states are discussed above, one of skill in the art would recognize that one or more additional bits could be added to an operation code of an instruction for any type of state. For example, a variety of additional states are defined by prefixes and other portions of instructions for certain types of microprocessors, such as Intel® IA-32 architecture microprocessors. One of skill in the art would recognize that one or more additional bits may be added to operation codes to account for these states, and corresponding extended operation code tables may be provided, to remove the need for conditional statements and/or coding branches in emulation software. One of skill in the art would also recognize that the disclosure is not limited to switching between 16-bit and 32-bit states. An additional bit may be added to an operation code, and a corresponding operation code table may be generated, to account for a switch between any two states, including any type of 8-bit, 16-bit, 32-bit, or 64-bit, or any other type of state.

Moreover, although examples of extended operation code tables including 512 operation codes and 1,024 operation codes are discussed above, the disclosure is not so limited. One of skill in the art would recognize that any number of additional bits could be added to operation codes of machine instructions, and extended operation code tables accounting for the increased number of bits may be provided. This may be done, for example, to remove additional conditional statements and/or coding branches that may otherwise be required in emulation software. However, the extended operation code table may need to be stored in processor cache memory of the computing device running the emulation software. Accordingly, one of skill in the art would recognize that there may be disadvantages to generating larger operation code tables. For example, providing an extended operation code table with greater than 1,024 operation codes may, in some cases, decrease performance of the emulator software as a result of the amount of processor cache memory such an extended operation code table may fill.

Furthermore, although only a single extended operation code table is described above, one of skill in the art would recognize that additional extended operation code tables may be generated. For example, one 1,024 operation code table may be generated for one byte operation codes, an additional 1,024 operation code table may be generated for two byte operation codes, and a third 1,024 operation code table may be generated for three byte operation codes. This way, the operation code tables could handle escapes to two byte operation codes and three byte operation codes.

In a computing environment, such as computing environment 300 of FIG. 3, the embodiments disclosed herein may be performed on a client device, such as one of client devices 310, 320, 330, or on a server, such as one of servers 340A, 340B. For example, a client device may store emulator software. In some embodiments, the emulator software may have been provided by a service provider, such as a antivirus software provider. The emulator software may have been installed on a client device from a memory device, such as a CD-ROM, DVD, or flash drive. Alternatively, the emulator software may have been downloaded from the service provider from one or more servers 340A, 340B. Alternatively, the embodiments disclosed herein may be performed on a server, such as one of servers 140A, 140B. For example, a server may store emulator software. Whether the embodiments disclosed herein are performed on a client device or a server, in some embodiments, the emulator software may be used as part of an antivirus scan for the computing device on which it is stored. For example, the emulator may emulate a particular microprocessor's instructions, and may run various applications installed on the computing device running the emulator software. In doing so, the emulator software may test software applications for malicious code and/or coding errors in a software environment, without allowing the problematic code to infect the computing device.

Embodiments of the present disclosure provide computerized systems, methods, and media that improve the performance of emulator software. By accounting for states of the microprocessor being emulated in extended operation codes, and in an extended operation code table, the number of conditional statements and/or coding branches required in the emulator software's code may be reduced, thereby increasing performance of the emulator software. Moreover, many computers today use look-ahead techniques to further increase the speed at which they process instructions. In some cases, conditional statements and/or coding branches may affect a computer's ability to use such look-ahead techniques. By reducing the number of conditional statements and/or coding branches in emulator software, the embodiments of the present disclosure may allow the look-ahead techniques to be used more effectively, thereby further increasing the speed and performance of the emulator software.

Computer programs based on the written description and methods of this specification are within the skill of a software developer. The various programs or program modules can be created using a variety of programming techniques. For example, program sections or program modules can be designed in or by means of C, C++, assembly language, or any such programming language. One or more of such software sections or modules can be integrated into a computer system or existing communications software.

At this point it should be noted that, as implied above, emulating microprocessor instructions in accordance with the present disclosure as described above may involve the processing of input data and the generation of output data to some extent. This input data processing and output data generation may be implemented in hardware or software. For example, specific electronic components may be employed in an application specific integrated circuit or similar or related circuitry for implementing the functions associated with emulating microprocessor instructions in accordance with the present disclosure as described above. Alternatively, one or more computer processors operating in accordance with instructions may implement the functions associated with emulating microprocessor instructions in accordance with the present disclosure described above. If such is the case, it is within the scope of the present disclosure that such instructions may be stored on one or more non-transitory computer-readable storage media (e.g., a magnetic disk or other storage medium), or transmitted to one or more computer processors via one or more signals embodied in one or more carrier waves.

The present disclosure is not limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, including all systems, methods, and non-transitory computer-readable media which fall within the true spirit and scope of the present disclosure.

The invention claimed is:

1. A computer-implemented method for emulating microprocessor instructions, the method comprising:
identifying, in a computing device, an instruction of a first software application using a second software application that emulates instructions of a type of microprocessor, wherein the instruction includes an instruction prefix and an operation code;
adding, in the computing device, an additional bit to a length of the operation code of the instruction to create an extended operation code, wherein the additional bit accounts for a program state set by the instruction prefix and wherein the extended operation code, including the additional bit, is represented in an operation code table of the second software application; and
emulating, in the computing device, execution of the instruction using the second software application and the extended operation code.

2. The computer-implemented method of claim 1, wherein the additional bit is a first additional bit, further comprising adding, in the computing device, a second additional bit to the length of the operation code of the instruction to create the extended operation code, wherein the extended operation code, including the first additional bit and the second additional bit, is represented in the operation code table of the second software application.

3. The computer-implemented method of claim 1, wherein the extended operation code includes 8 bits and the operation code table of the second software application includes 256 operation codes.

4. The computer-implemented method of claim 3, wherein the extended operation code includes 10 bits and the operation code table of the second software application includes 1024 operation codes.

5. The computer-implemented method of claim 1, wherein the instruction prefix represents a size of an operand of the instruction.

6. The computer-implemented method of claim 5, wherein the instruction prefix causes an operand of the instruction to be interpreted as having a 16-bit or 32-bit size.

7. The computer-implemented method of claim 1, wherein the instruction prefix represents a size of an address of the instruction.

8. The computer-implemented method of claim 7, wherein the instruction prefix causes an address of the instruction to be interpreted as having a 16-bit or 32-bit size.

9. The computer-implemented method of claim 1, wherein the operation code is a byte in length, and the extended operation code is at least 9 bits in length.

10. A system for emulating microprocessor instructions, the system comprising:
one or more memory devices that store instructions; and
one or more computer processors that execute the instructions to:
identify an instruction of a first software application using a second software application that emulates instructions of a type of microprocessor, wherein the instruction includes an instruction prefix and an operation code;
add an additional bit to a length of the operation code of the instruction to create an extended operation code, wherein the additional bit accounts for a program state set by the instruction prefix and wherein the extended operation code, including the additional bit, is represented in an operation code table of the second software application; and
emulate execution of the instruction using the second software application and the extended operation code.

11. The system of claim 10, wherein the additional bit is a first additional bit, the one or more processors further executing the instructions to add a second additional bit to the length of the operation code of the instruction to create the extended operation code, wherein the extended operation code, including the first additional bit and the second additional bit, is represented in the operation code table of the second software application.

12. The system of claim 10, wherein the extended operation code includes 8 bits and the operation code table of the second software application includes 256 operation codes.

13. The system of claim 12, wherein the extended operation code includes 10 bits and the operation code table of the second software application includes 1024 operation codes.

14. The system of claim 10, wherein the instruction prefix represents a size of an operand of the instruction.

15. The system of claim 14, wherein the instruction prefix causes an operand of the instruction to be interpreted as having a 16-bit or 32-bit size.

16. The system of claim 10, wherein the instruction prefix represents a size of an address of the instruction.

17. The system of claim 16, wherein the instruction prefix causes an address of the instruction to be interpreted as having a 16-bit or 32-bit size.

18. The system of claim 10, wherein the operation code is a byte in length, and the extended operation code is at least 9 bits in length.

19. A non-transitory computer-readable medium storing instructions that, when executed by one or more computer processors, causes the one or more computer processors to perform a method for emulating microprocessor instructions, the method comprising:
   identifying an instruction of a first software application using a second software application that emulates instructions of a type of microprocessor, wherein the instruction includes an instruction prefix and an operation code;
   adding an additional bit to a length of the operation code of the instruction to create an extended operation code, wherein the additional bit accounts for a program state set by the instruction prefix and wherein the extended operation code, including the additional bit, is represented in an operation code table of the second software application; and
   emulating execution of the instruction using the second software application and the extended operation code.

20. The non-transitory computer-readable medium of claim 19, wherein the additional bit is a first additional bit, the method further comprising adding a second additional bit to the length of the operation code of the instruction to create the extended operation code, wherein the extended operation code, including the first additional bit and the second additional bit, is represented in the operation code table of the second software application.

* * * * *